US008543004B2

(12) United States Patent
Eiselt (10) Patent No.: US 8,543,004 B2
(45) Date of Patent: Sep. 24, 2013

(54) WAVELENGTH LOCKING METHOD FOR AN OPTICAL TRANSCEIVER DEVICE AND OPTICAL TRANSCEIVER DEVICE

(75) Inventor: Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 107 days.

(21) Appl. No.: 13/328,093

(22) Filed: Dec. 16, 2011

(65) Prior Publication Data

US 2013/0089324 A1    Apr. 11, 2013

(30) Foreign Application Priority Data

Jul. 20, 2011    (EP) .................................... 11401556

(51) Int. Cl.
*H04B 10/00* (2013.01)
*H04B 10/12* (2011.01)
*H04B 10/06* (2011.01)

(52) U.S. Cl.
USPC ........... 398/137; 398/135; 398/136; 398/138; 398/139; 398/196; 398/197; 398/201; 398/213

(58) Field of Classification Search
None
See application file for complete search history.

(56) References Cited

U.S. PATENT DOCUMENTS

| 5,448,390 | A  | * | 9/1995 | Tsuchiya et al. ................. 398/42 |
| 6,078,418 | A  | * | 6/2000 | Hansen et al. ................. 398/147 |
| 6,366,379 | B1 | * | 4/2002 | Terahara et al. ............. 398/213 |
| 7,720,384 | B2 | * | 5/2010 | Kunimatsu et al. ............. 398/95 |
| 7,937,000 | B2 | * | 5/2011 | Yokoyama ..................... 398/213 |
| 2003/0042407 | A1 | | 3/2003 | Jacobowitz et al. |
| 2005/0123300 | A1 | | 6/2005 | Kim et al. |
| 2009/0060497 | A1 | * | 3/2009 | Way .............................. 398/27 |
| 2009/0257748 | A1 | | 10/2009 | Nemoto |
| 2011/0085794 | A1 | * | 4/2011 | Lei et al. ......................... 398/25 |
| 2011/0158651 | A1 | * | 6/2011 | Tang et al. ..................... 398/98 |

FOREIGN PATENT DOCUMENTS

EP    0765052 A2    3/1997

OTHER PUBLICATIONS

European Search Report for Application No. 11401556.3 issued Feb. 13, 2012; 4 pages.

* cited by examiner

*Primary Examiner* — Kenneth N Vanderpuye
*Assistant Examiner* — Merlin Brito Peguero
(74) *Attorney, Agent, or Firm* — Summa, Addition & Ashe, P.A.

(57) ABSTRACT

In one aspect, the present invention embraces a wavelength locking method for causing a narrow-band wavelength spectrum of an optical transmit signal of an optical transceiver device to track a narrow-band wavelength spectrum of an optical receive signal received by the optical transceiver device Further, the present invention embraces a wavelength lockable optical transceiver device, especially for a passive optical transmission network, using this wavelength locking method.

16 Claims, 4 Drawing Sheets

WAVELENGTH LOCKING METHOD FOR AN OPTICAL TRANSCEIVER DEVICE AND OPTICAL TRANSCEIVER DEVICE

CROSS-REFERENCE TO PRIORITY APPLICATION

This application is a continuation of and claims priority to the commonly assigned European Patent Application Serial No. 11 401 556 (filed Jul. 20, 2011, in the European Patent Office), which is hereby incorporated by reference in its entirety.

FIELD OF THE INVENTION

The invention relates to a wavelength locking method for causing a narrow-band wavelength spectrum of an optical transmit signal of an optical transceiver device to track a narrow-band wavelength spectrum of an optical receive signal received by the optical transceiver device and to a respective optical transceiver device.

BACKGROUND

In most types of optical data transmission networks, especially in wavelength division multiplex (WDM) networks, it is necessary to stabilize the optical transmission wavelength of the optical transmitters which are usually laser diodes. For this purpose the lasers usually include a thermo-electric cooler and/or a wavelength locker. Known wavelength lockers often include a wavelength discriminator, for example a Fabry-Perot etalon. It is also known to lock the optical center wavelength or optical center frequency of a tunable laser to a desired value using a wavelength (or frequency) locker.

Further, various concepts exist that eliminate a thermo-electric cooler and/or a wavelength locker for each optical transmitter unit within an optical access network, for example within a WDM passive optical network (WDM-PON). For these applications it is known to base the wavelength control on a centralized wavelength locker, which is located either at the optical line termination (OLT) or at a remote node (RN).

However, when using a centralized wavelength locker at the OLT, the tuning information needs to be transmitted from the OLT location to the tunable laser in the optical networking unit (ONU) using a communication channel, which requires additional effort. Furthermore, frequency dithering at multiple distinct dither frequencies is required to distinguish between the ONUs. With a wavelength locker at the RN, the feedback signal is an analog optical signal, which needs to be detected at the ONU, also requiring additional hardware effort. Furthermore, the insertion loss of the (reflective) wavelength locker reduces the power budget of the network. Both methods are not directly applicable for other network scenarios, like metro WDM systems, for which currently no solution exists.

SUMMARY

It is thus an object of the present invention to provide a wavelength locking method for causing a narrow-band wavelength spectrum of an optical transmit signal of an optical transceiver device to track a narrow-band wavelength spectrum of an optical receive signal received by the optical transceiver device that may be realized at low cost without the need of a wavelength locker at the location of the transceiver device and without the need of a communication channel for communicating tuning information. It is a further object of the invention to provide a corresponding transceiver device.

The invention starts from the finding that a complicated and expensive wavelength locker including a device for defining the reference wavelength can be replaced by using the center wavelength of the receive signal as the reference wavelength and to tune a tunable optical filter with its at least one narrow filter band so that it matches with the wavelength of the receive signal. Simultaneously or after this first tuning process, the center wavelength of the transmit signal created by the tunable optical transmitter unit can be tuned with respect to the same filter band or a further filter band of the tunable optical filter depending on whether the wavelength of the transmit signal shall be equal to the wavelength of the receive signal. Here it shall be mentioned that in this respect the term "wavelength" shall not only be understood in the sense of a single discrete wavelength, for example the center wavelength of the respective signal, but shall also cover the meaning of a narrow bandwidth wavelength spectrum. The bandwidth of the respective narrow filter band of the tunable optical filter may be broader or (slightly) narrower than the spectrum of the receive signal and the transmit signal, respectively.

The tuning process for tuning the tunable optical filter is effected by monitoring the optical power of the filtered optical receive signal and shifting the spectral position of the narrow filter band that has been applied to the receive signal such that the detected optical power is maximized. For monitoring the optical power of the receive signal, either the whole filtered signal may be detected by the receiver unit which receives the optical signal and extracts the information contained therein, or a (smaller) portion of the receive signal may be tapped off and detected by a separate monitoring unit. Similarly, the process for tuning the wavelength of the optical transmit signal is effected by monitoring the optical power of the filtered optical transmit signal and shifting the spectral position of the wavelength of the filtered transmit signal such that the monitored optical power is maximized. For monitoring the optical power of the transmit signal a (smaller) portion of the transit signal may be tapped off and detected by a further monitoring unit.

However, the definition "monitoring the optical power of a specified signal" used within this description shall cover a direct or indirect monitoring of the respective optical signal power. In other words, for monitoring the signal power either the optical power of the signal itself or any other parameter of a physical entity related to the optical signal power may be detected and evaluated. For example, instead of tapping off a predetermined portion of the optical power from the optical signal to be monitored and detecting and directly monitoring the optical power of the signal which has been tapped off it is also possible to detect and directly monitor the optical signal which is reflected from the tunable filter (if a transmission filter is used) or the optical signal which is transmitted through the tunable filter (if a reflective filter is used) as this signal and its optical power, respectively, is directly linked to the signal to be monitored. In this case, the optical power of the signal to be monitored reaches a maximum when the optical power of the signal detected reaches a minimum value.

In general, the process for tuning the tunable optical filter can be applied simultaneously or before tuning the wavelength of the tunable optical transmitter unit. Both processes may either be affected continuously or in predetermined time intervals. In the latter case, in a first step the optical filter may be tuned with respect to the receive signal wavelength and in a second step the wavelength of the transmit signal created by the optical transmit unit may be tuned with respect to the same or a (selected) further filter band of the tunable optical filter.

The method according to the invention thus enables a local wavelength control without communication between the location of the tunable laser (e.g. an ONU) and the location of a centralized wavelength locker (e.g. an OLT or RN). In addition, using a tunable filter in the receive direction allows the selection of a receive wavelength channel out of a wavelength division multiplex.

According to an embodiment of the invention, the tunable optical filter is a reflective filter and the optical input path includes a first optical signal switching device adapted to feed the optical receive signal from the transceiver device input port to a first port of the tunable optical filter and to feed the reflected portion of the optical receive signal from the tunable optical filter first port to the optical receiver unit.

Additionally, the optical output path may include a second optical signal switching device adapted to feed the optical transmit signal from the tunable optical transmitter unit to a second port of the tunable optical filter and to feed the reflected portion of the optical transmit signal from the tunable optical filter second port to the transceiver device output port.

In another embodiment the tunable optical filter is realized as transmission filter comprised within the optical input path and within the optical output path. The optical input path may further include a first optical signal switching device adapted to feed the optical receive signal from the transceiver device input port to a first port of the tunable optical filter and a second optical signal switching device adapted to feed the transmitted portion of the optical receive signal from a second port of the tunable optical filter to the optical receiver unit.

Additionally, the optical output path may include the second optical signal switching device adapted to feed the optical transmit signal from the transmitter unit to the tunable optical filter second port and the first optical signal switching device adapted to feed the transmitted portion of the optical transmit signal from the tunable optical filter second port to the optical transceiver output port.

The afore-mentioned embodiments are especially suitable for transmission links which are terminated at the transceiver device and which use separate fibers or optical waveguides for uplink and downlink transmission.

In a further embodiment the tunable optical filter is a transmission filter comprised within the optical input path and within the optical output path, the transceiver device input and output port being a single connection port connected to a first port of the tunable optical filter. The optical input path includes an optical signal switching device adapted to feed a portion of the optical receive signal which is transmitted through the tunable optical filter from a second port of the tunable optical filter to the optical receiver unit, and the optical output path includes the optical signal switching device further adapted to feed the optical transmit signal received from the optical transmitter unit to the tunable optical filter second port. Of course, this embodiment uses a single fiber or optical waveguide for the uplink and downlink.

Especially in embodiments which use separate fibers for the uplink and downlink, the transmit signal may be created with an optical spectrum lying within the same narrow filter band of the tunable optical filter, which is used for tuning the tunable optical filter to the optical spectrum of the optical receive signal.

If the transmit signal is created with an optical spectrum lying within a different narrow filter band of the tunable optical filter than the narrow filter band which is used for tuning the tunable optical filter to the optical spectrum of the optical receive signal, the transceiver device may be connected by a single fiber or optical waveguide realizing the uplink and downlink. Of course, different filter bands and thus different wavelengths for the upstream and downstream transmission may also be used if separate fibers are used for the uplink and downlink.

The optical signal switching device may be realized as optical circulator device, independently from the receive signal and the transmit signal lying within the same narrow filter band or within different narrow filter bands.

If the receive and transmit signals lie within different filter bands, the optical signal switching device may also be realized as optical band splitting device adapted to separate the transmit path and the receive path for the optical transmit signal and the optical receive signal lying within the different narrow filter bands.

As a device adapted to tap off a portion of the optical power of the receive signal as a first monitoring signal and the device adapted to tap off a portion of the optical power of the transmit signal as a second monitoring signal an optical coupler may be used which is comprised with the optical path in which a respective optical signal is present.

Further embodiments of the invention are described herein.

BRIEF DESCRIPTION OF THE DRAWINGS

The foregoing and other objects and advantages of the invention and the manner in which the same are accomplished will become clearer based on the following detailed description taken in conjunction with the accompanying drawings in which.

DETAILED DESCRIPTION

The present invention will now be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
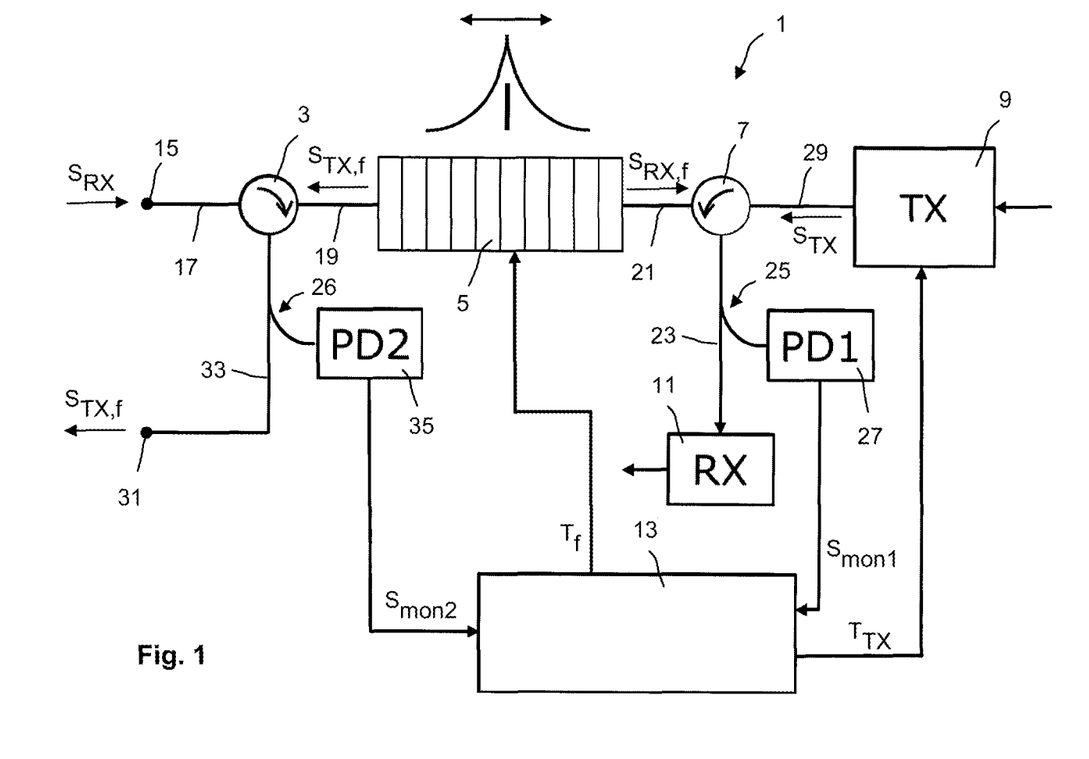
FIG. 1 is a schematic block diagram of a first embodiment of an optic transceiver device according to the invention being designed for two-fiber transmission and using a tunable optical transmission filter.

FIG. 1 shows a schematic block diagram of a transceiver device 1 according to a first embodiment. The transceiver device 1 includes a first signal switching device in the form of an optical circulator 3, a tunable optical filter 5, a second optical signal switching device 7, an optical transmitter unit 9, an optical receiver unit 11 and a controller unit 13. An optical input path for guiding an optical receive signal $S_{RX}$ which is supplied to an optical input port 15 to the optical receiver unit includes an optical wave guide 17 connecting the input port 15 to a first port of the circulator 3, an optical wave guide 19 connecting a second port of the circulator 3 and a first port of the optical filter 5, an optical wave guide 21 connecting a second port of the optical filter 5 and a first port of the optical circulator 7 and an optical wave guide 23 connecting a second port of the circulator 7 and an optical input port of the receiver unit 11. The optical circulator 3 is designed such that the optical receive signal $S_{RX}$ received at the first port is switched to the second port and is thus supplied to the first port of the optical filter 5. This optical receive signal $S_{RX}$ is transmitted through the tunable optical filter 5 which is a transmission type optical filter to the second filter port and is supplied to the first port of the circulator 7 by the optical wave guide 21. The circulator 7 is designed such that the filtered optical receive signal $S_{RX,f}$ is switched to the second port and thus supplied to the input port of the optical receiver unit by the optical wave guide 23.

The receiver unit 11 converts the filtered optical signal into an electrical signal and may also regenerate the digital signal.

Further, the optical wave guide 23 or the respective optical path includes device 25 for tapping of a predetermined portion of the optical power of the filtered receive signal $S_{RX,f}$. This smaller portion of the optical power of the filtered receive signal $S_{RX,f}$ is supplied to an optical input port of a monitoring device 27. Of course, the device for splitting off the desired power portion of the optical receive signal may be realized as an optical coupler (e.g., an unsymmetric optical coupler) and the monitoring device may include a photodiode for converting the signal received into an electrical signal proportional to the optical power of the signal received. The electrical signal which is a measure for the optical power of the tapped off portion of the signal $S_{RX,f}$ is supplied to the controller unit 13.

The controller unit 13 creates a tuning signal $T_f$ for tuning the tunable optical filter 5 so that the monitored optical signal and the corresponding electrical monitoring signal $S_{mon1}$ reaches a maximum value.

This optimum status is achieved if either the whole optical spectrum of the receive signal $S_{RX}$ lies within the narrow bandwidth of the tunable optical filter or, in case the filter bandwidth is narrower than the signal spectrum, if the spectral position of the narrow filter band with respect to the signal spectrum is controlled such that the maximum optical power is transmitted through the filter.

An optical output path between the optical output port of the transmitter unit 9 and an optical output port 31 of the transceiver device includes an optical wave guide 29 connecting the optical output port of the transmitter unit 9 and a third port of the circulator 7, the optical wave guide 21, the tunable optical filter 5, the optical wave guide 19 and a further optical wave guide 33 connecting a third port of the circulator 3 to the optical output port 31. The transmitter unit 9 creates an optical transmit signal $S_{TX}$ depending on an electrical or optical information signal that is supplied to the transmitter unit 9. The circulator 7 is designed such that the transmit signal $S_{TX}$ received at the third port is switched to the first circulator port and is thus supplied to the second filter port via the optical wave guide 21. The filtered optical transmit signal $S_{TX,f}$ is output at the first filter port and supplied, via the optical wave guide 19, to the second port of the circulator 3. The circulator 3 is designed such that the filtered transmit signal $S_{TX,f}$ received at the second circulator port is switched to the third circulator port and thus supplied to the output port 31.

Within the optical path of the wave guide 33 a predetermined portion of the filtered optical signal $S_{TX,f}$ is tapped off by a suitable optical device 26, typically by an (unsymmetric) optical coupler. The tapped off signal is supplied to the input port of a second monitoring device 35 which, similarly to the first monitoring device 27, is adapted to monitor the respective optical signal. An electrical monitoring signal $S_{mon2}$ which includes information corresponding to the optical power of the monitored optical signal is supplied to the controller unit 13.

As apparent from the above explanation the optical input path and the optical output path overlap between the second port of the first circulator 3 and the first port of the second circulator 7.

In order to tune the spectral position of the (narrow band) transmit signal $S_{TX}$ to the spectrum of the receive signal $S_{RX}$ the controller unit 13 creates a tuning signal $T_{TX}$ which is supplied to the transmitter unit 9.

The transmitter unit 9, which is a tunable transmitter unit, controls the optical transmit signal $S_{TX}$ with respect to the optical position of the optical signal spectrum according to the transmitter unit tuning signal $T_{TX}$. The controller unit 13 creates the tuning signal $T_{TX}$ depending on the monitoring signal $S_{mon2}$ such that the monitoring signal $S_{mon2}$ achieves a maximum value. This maximum value is achieved, if the optical spectrum of the transmit signal $S_{TX}$ lies fully within the respective filter band of the tunable optical filter 5 or is positioned with respect to the filter band such that the signal $S_{TX}$ is transmitted with a maximum optical power.

The control processes for tuning the optical filter 5 and the tunable transmitter unit 9, respectively, may be applied simultaneously or one after the other. The processes may also be applied continuously or in predetermined time intervals.

Figure 2:
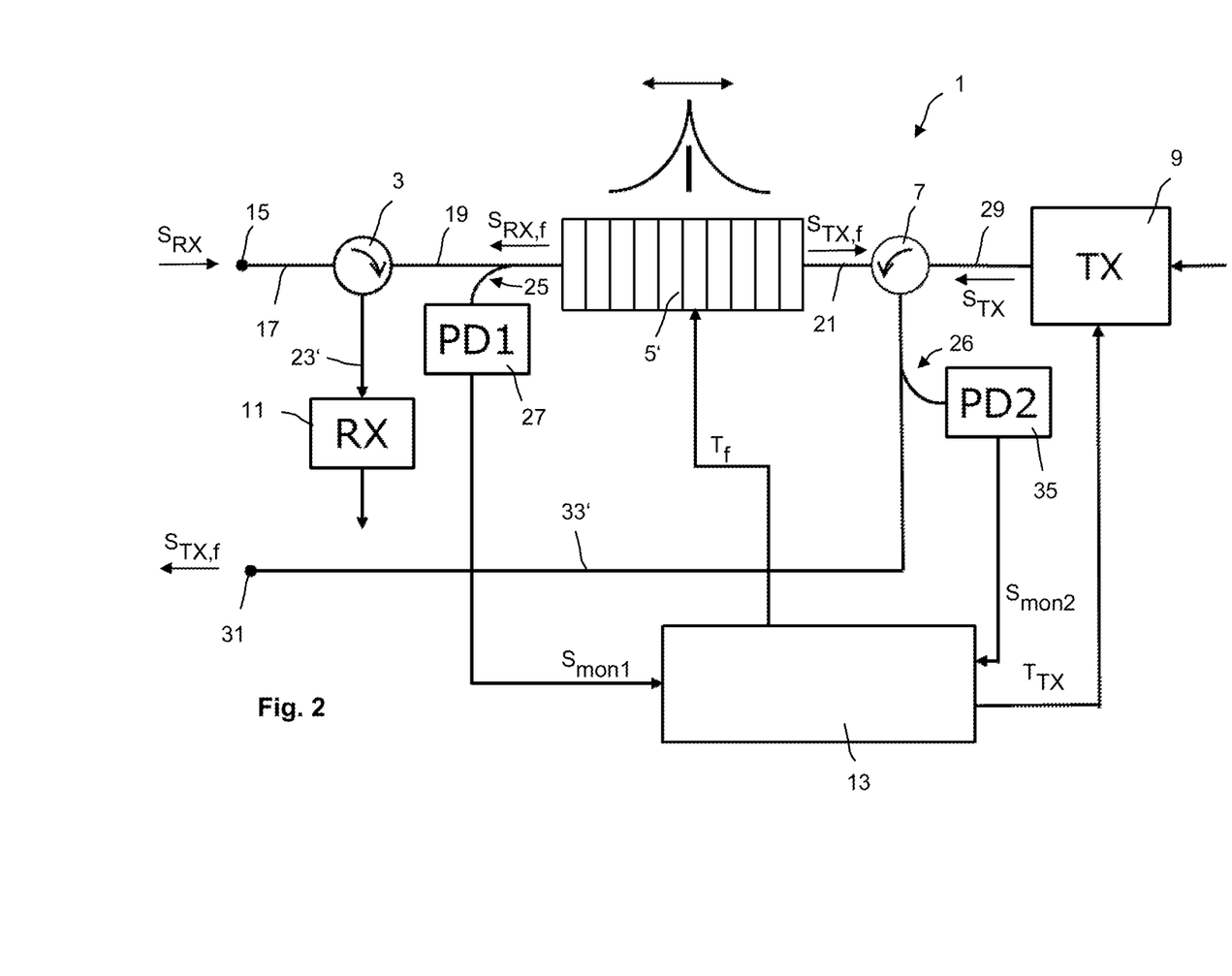
FIG. 2 is a schematic block diagram of a second embodiment of an optic transceiver device according to the invention being designed for two-fiber transmission and using an tunable optical reflective filter.

The further embodiment of a transceiver device providing locking of the transmit wavelength to the receive wavelength is shown in FIG. 2. This embodiment uses a tunable optical filter 5' of the reflective filter type. Therefore, the optical input and output paths differ to a certain extent from the respective paths of the embodiment according to FIG. 1. The optical input path between the optical input port 15 and the input port of the receiver unit 11 includes the optical wave guide 17, the circulator 3, the optical wave guide 19 and the wave guide 23' which is connected to the third port of the circulator 3 and the input port of the receiver unit 11. The receive signal $S_{RX}$ supplied to the input port 15 is switched, by the circulator 3, from its first port to its second port and is supplied via the optical wave guide 19 to the first port of the reflective type tunable filter 5'. The reflected filtered optical receive signal $S_{RX,f}$ which is fed to the second port of the circulator 3 is switched to the third circulator port and supplied, via the optical wave guide 23', to the input port of the transmitter unit 11. Within the optical path of the wave guide 19 the device 25 for tapping off the desired portion of the optical power of the reflected receive signal $S_{RX,f}$ is provided. The respective optical monitoring signal is supplied to the input port of the first monitoring unit 27 which creates the respective electrical monitoring signal $S_{mon1}$ and supplies this signal to the controller unit 13.

The optical output path between the output port of the transmitter unit 9 and the output port 31 of the transceiver device includes the optical wave guide 29, the circulator 7, the optical wave guide 21 and the optical wave guide 33' which, in this case, connects the second port of the circulator 7 to the optical output port 31.

The optical transmit signal $S_{TX}$ created by the tunable optical transmitter unit 9 is supplied to the third port of the circulator 7 and thus switched to the first circulator port which is connected to the second filter port. As the filter 5' is a reflective type filter the filtered (reflected) transmit signal $S_{RX,f}$ is supplied to the first port of the circulator 7 and thus switched to the second circulator port which is connected to the optical output port 31 of the transceiver device 1.

Within the optical path of the wave guide 33' the device 26 for tapping of the desired portion of the optical power of the filtered transmit signal $S_{RX,f}$ it is provided, the tapped off signal being supplied to the input port of the second monitoring unit 35. The electrical monitoring signal $S_{mon2}$ created by the second monitoring unit 35 is again fed to the control unit 13.

The processes for tuning the tunable optical filter 5' and the tunable optical transmitter unit 9, respectively, are the same as explained above regarding the embodiment of FIG. 1.

As in the embodiments according to FIGS. 1 and 2 the same (narrow) filter band of the tunable optical filter 5, 5' is used in order to achieve the locking of the transmit wavelength to the receive wavelength the transmit signal $S_{TX}$ lies within the same band (or channel bandwidth) as the optical receive signal $S_{RX}$.

As a tunable optical filter (of the transmission or reflective type), a filter using a fiber Bragg grating can be used. The tuning of such a fiber Bragg grating can be effected by applying thermal or mechanical stress. Both sides of the grating fiber are equivalent such that the receive signal can be coupled to the grating via one side, while the transmit signal is coupled via the other side, as explained above.

It is, however, also possible to use a tunable optical filter (of the transmission or reflective type) having more than one narrow filter band. For example, a Fabry-Perot filter reveals a periodic filter spectrum, the filter bands revealing a specific wavelength or frequency distance (designated as free spectral range FSR). Such a periodic filter can also be a delay-line interferometer, a ring resonator, or any other tunable optical structure providing a periodic transfer function. In fact, the transfer function does not need to be periodic. It is sufficient that the transfer function is designed such that the filter, when one order (one filter band) is tuned to the receive wavelength at least one of the other orders (filter bands) coincide with the desired transmit wavelength. In this way, if one order or filter band of the tunable optical filter 5, 5' is tuned to track the receive wavelength of the receive signal $S_{RX}$ in its respective band, the transmit wavelength of the transmit signal $S_{TX}$ tracks the other order or filter band of the tunable optical filter, falling into the transmit band.

For such embodiments of transceiver devices it is not necessary that the FSR equals the required receive-transmit frequency separation, but the FSR needs to be an integer fraction of this separation. If the wavelength of the optical transmit signal $S_{TX}$ can be approximately tuned to the desired transmit wavelength, the desired order (filter band) of the periodic filter is used for precise tuning of the wavelength of the transmit signal $S_{TX}$.

Figure 3:
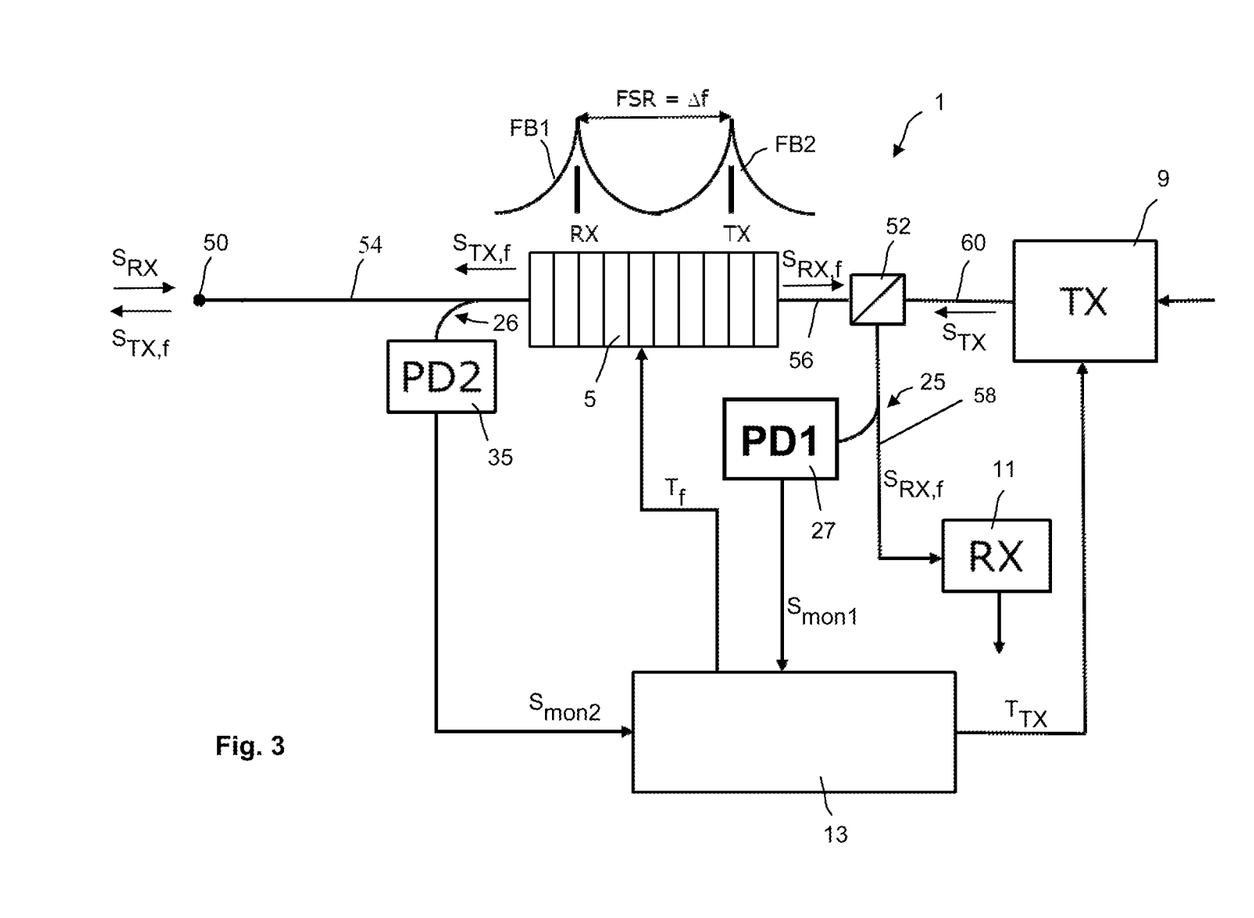
FIG. 3 is a schematic block diagram of a third embodiment of an optic transceiver device according to the invention being designed for single-fiber transmission and using an optical tunable transmission filter, the transmission in the two directions being effected at different wavelengths corresponding to two directly neighboring filter bands of the tunable optical filter.
Figure 4:
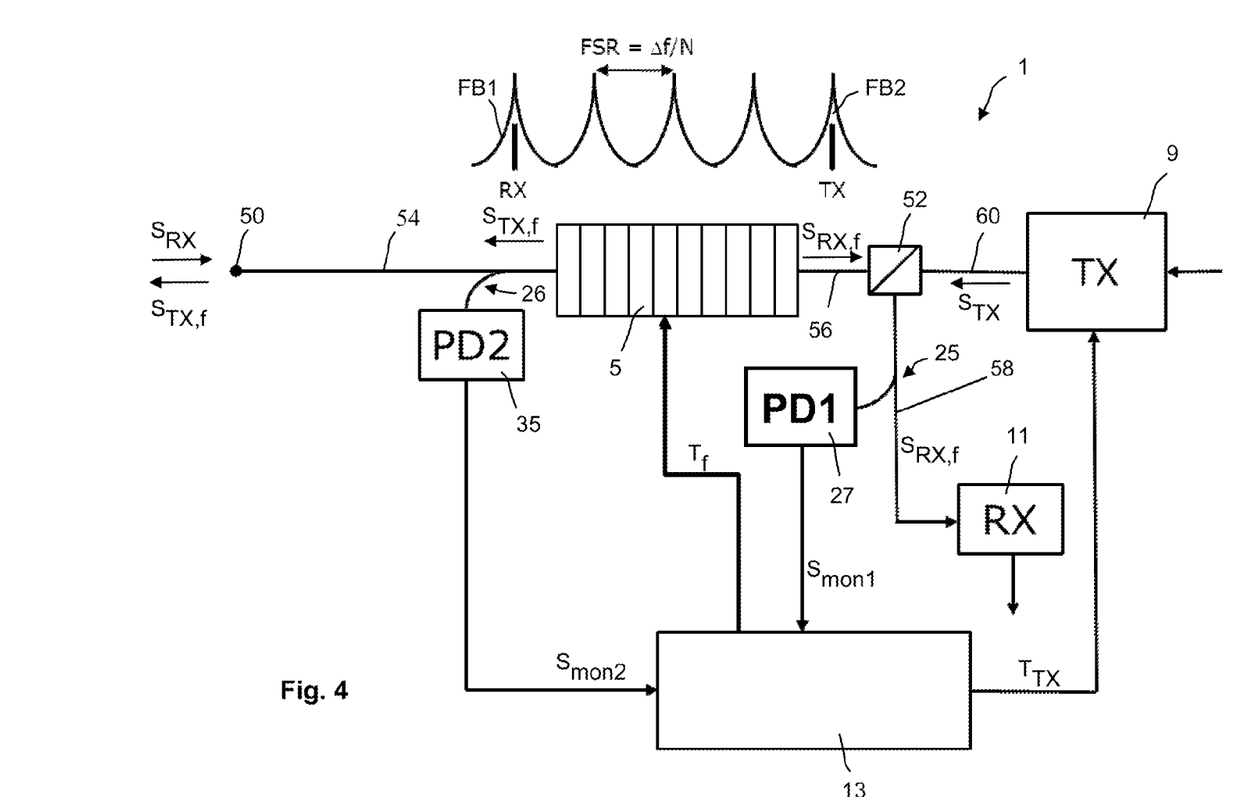
FIG. 4 is a schematic block diagram of a fourth embodiment of an optic transceiver device similar to the embodiment of FIG. 3, the two filter bands of the tunable optical filter being separated by the two-fold or arbitrary multiple of the free spectral range of the filter.

This type of filter having at least two narrow filter bands spaced apart by a given FSR is used for the embodiments according to FIGS. 3 and 4. These embodiments merely differ by the filter 5 or the selection of the filter band (order of the filter band) used for the wavelength tracking.

Both embodiments include a common optical input/output port 50 of the optical transceiver device, a tunable optical filter 5 (of the transmission type), a tunable transmitter unit 9, a receiver unit 11, a first and second monitoring unit 27, 35, a signal switching device in the form of an optical band splitter 52, and a controller unit 13.

The optical input path between the input port 50 and the input port of the receiver unit 11 includes an optical waveguide 54 connecting the input port 50 and a first filter port, the filter 5 itself, an optical waveguide 56 connecting a second filter port to a first (common) port of the band splitter 52 and a wave guide 58 connecting a second port (splitting port) of the band splitter 52 to the input port of the receiver unit 11. Within the optical path of the wave guide 58 a device 25 adapted to tap off a predetermined portion of the optical power of the filtered optical signal $S_{RX,f}$ is provided which may again be realized by an (unsymmetric) optical coupler. The split off portion of the optical signal $S_{RX,f}$ is supplied as a first monitoring signal to the first monitoring unit 27 which creates the first monitoring signal $S_{mon1}$ that is supplied to the controller unit 13.

The optical output path between the output port of the tunable optical transmitter unit 9 and the port 50 of the transceiver device includes a wave guide 60 connecting the output port of the transceiver unit to a third port of the band splitter 52, the wave guide 56, the filter 5 and the optical wave guide 54.

The optical transmit signal $S_{TX}$ created by the transmitter unit 9 is supplied to the third port of the band splitter 52 and is therefore output at the first (common) port and supplied to the second filter port. The filtered transmit signal $S_{TX,f}$, which is output at the first filter port, is supplied to the common input/output port 50 of the transceiver unit 1. Within the optical path of the wave guide 54 a second device 26 adapted to tap off a desired portion of the optical power of the filtered transmit signal $S_{TX,f}$ is provided. Again, this device 26 for tapping of a desired signal portion may be realized as optical (unsymmetric) coupler. The tapped off signal is supplied to the input port of the second monitoring unit 35 which creates an electrical monitoring signal $S_{mon2}$ that is supplied to the controller unit 13.

As schematically shown in FIG. 3, a first filter band FB1 is used for tuning the tunable optical filter 5. For this purpose, the controller unit 13 creates the tuning signal $T_f$ such that the filter is tuned, with its first filter band FB1, to the wavelength or optical spectrum of the receive signal $S_{RX}$. The tuning process may be performed in the same way as described above for the embodiments according to the FIGS. 1 and 2.

As apparent from the schematic filter transfer function (or filter spectrum) in FIG. 3, the filter 5 has a second filter band FB2 separated by the frequency distance $\Delta f$ according to the free spectral range FSR of the filter. This second filter band FB2 is used for tuning the wavelength or optical spectrum of the transmit signal $S_{TX}$ created by the tunable transmitter unit 9. For this purpose, the controller unit 13 may start with a tuning signal $T_{TX}$ controlling the tunable transmitter unit 9 such that the optical transmit signal $S_{TX}$ has an optical spectrum lying in a certain region around the center of the second filter band FB2. The fine tuning is then effected as described above. The embodiment according to FIG. 4 merely differs from the embodiment according to FIG. 3 in that not the directly neighboring order or filter band of the periodic tunable optical filter 5 is used in order to tune the transmit signal wavelength but a filter band which reveals a distance of four times the FSR from the first filter band. For simplicity, the filter band used for tuning the transmit signal wavelength is again designated with FB2.

Using a periodic filter having a plurality of filter bands wherein each filter band corresponds to the channel bandwidth of a WDM signal it is possible to use the structure for a transceiver device according to FIG. 4 to select the channel for the transmit signal $S_{TX}$.

Of course, it is possible to use different filter bands for the receive and transmit signals in the embodiments according to FIGS. 1 and 2. In such embodiments corresponding to FIG. 1 (not shown) the circulators may be replaced by band splitters the common port of which is connected to the respective filter port in order to separate the signals in the input and output paths. In the embodiments corresponding to FIG. 2 (not shown) the input and output paths are separate (only the filter 5' with its two filter ports is in common) so that the circulators are still necessary and may not be replaced by simple band separators.

Similarly, the respective optical band splitter in the embodiments according to the FIGS. 3 and 4 may be replaced by an optical circulator that switches the filtered optical receive signal SRX,f received from the filter port to the receiver unit 11 and the optical transmit signal received from the transmitter unit 9 to the filter port.

LIST OF REFERENCE SIGNS 1 transceiver device
3 optical circulator
5 optical tunable filter
7 optical circulator
9 optical transmitter unit
11 optical receiver unit
13 controller unit
15 optical input port
17 optical waveguide
19 optical waveguide
21 optical waveguide
23 optical waveguide
25 device for tapping off a power portion of the signal $S_{RX,f}$
26 device for tapping off a power portion of the signal $S_{TX,f}$
27 monitoring unit
29 optical waveguide
31 optical output port
33 optical waveguide
35 monitoring unit
50 common optical input/output port
52 band splitter
54 optical waveguide
56 optical waveguide
58 optical waveguide
60 optical waveguide
$S_{RX}$ optical receive signal
$S_{RX,f}$ filtered optical receive signal
$S_{TX}$ optical transmit signal
$S_{TX,f}$ filtered optical transmit signal
$S_{mon1}$ electrical monitoring signal
$S_{mon2}$ electrical monitoring signal
$T_f$ filter tuning signal
$T_{TX}$ transmitter unit tuning signal
FB1 first filter band
FB2 second filter band In the drawings and specification, there have been disclosed typical embodiments on the invention and, although specific terms have been employed, they have been used in a generic and descriptive sense only and not for purposes of limitation, the scope of the invention being set forth in the following claims.

The invention claimed is:

1. A wavelength locking method for causing a narrow-band wavelength spectrum of an optical transmit signal of an optical transceiver device to track a narrow-band wavelength spectrum of an optical receive signal received by the optical transceiver device, the method comprising the steps of:
  (a) (i) monitoring the optical power of the optical receive signal ($S_{RX}$) filtered by a tunable optical narrow-band filter (5, 5') having at least one narrow filter band and (ii) tuning the tunable optical narrow-band filter (5, 5') with respect to the spectral position of the narrow filter band, which is applied to the receive signal ($S_{RX}$), such that the monitored optical power of the filtered optical receive signal ($S_{RX,f}$) reaches a maximum value; and
  (b) simultaneously, or after finishing step (a), (i) monitoring the optical power of the optical transmit signal ($S_{TX}$) filtered by said tunable optical narrow-band filter (5, 5') and (ii) tuning the spectral position of the wavelength spectrum of the optical transmit signal ($S_{TX}$) with respect to the spectral position of a predetermined one of the at least one narrow filter bands, which is applied to the transmit signal ($S_{TX}$), such that the monitored optical power of the filtered optical transmit signal ($S_{TX,f}$) reaches a maximum value.

2. A method according to claim 1, wherein the whole optical power of the filtered optical receive signal ($S_{RX,f}$) is used as a monitoring signal for monitoring the power of the optical receive signal ($S_{RX}$).

3. A method according to claim 1, wherein a tapped-off portion of the optical power of the filtered optical receive signal ($S_{RX,f}$) is used as a monitoring signal for monitoring the power of the optical receive signal ($S_{RX}$).

4. A method according to claim 1, wherein a tapped-off portion of the optical power of the filtered optical transmit signal ($S_{TX,f}$) is used as a monitoring signal for monitoring the power of the optical transmit signal ($S_{TX}$).

5. A wavelength lockable optical transceiver device, especially for a passive optical transmission network, comprising:
  a tunable optical transmitter unit (9);
  an optical receiver unit (11);
  a tunable optical narrow-band filter (5, 5') having at least one narrow filter band;
  a first and a second monitoring unit (27, 35);
  a controller unit (13) connected to the first (27) and second (35) monitoring unit, the tunable optical narrow-band filter (5, 5'), and the tunable optical transmitter unit (9);
  an optical input path for receiving an optical receive signal ($S_{RX}$) at an input port (15, 50) and for supplying the receive signal ($S_{RX}$) via the tunable optical narrow-band filter (5, 5'), the optical input path comprising a device (25) for tapping off at least a portion of the optical power of the filtered receive signal ($S^{RX}$) as a first monitoring signal and supplying the first monitoring signal to the first monitoring unit (27) for creating a first electrical monitoring signal ($S_{mon1}$) depending on the optical power of the filtered receive signal ($S_{RX,f}$); and
  an optical output path for receiving an optical transmit signal ($S_{TX}$) created by the transmitter unit (9) and for supplying the transmit signal ($S_{TX}$) via the tunable optical narrow-band filter (5, 5') to an optical output port (31, 50), the optical output path comprising a device (26) for tapping off a portion of the optical power of the filtered transmit signal ($S_{TX,f}$) as a second monitoring signal and for supplying the second monitoring signal to the second monitoring unit (35) for creating a second electrical monitoring signal ($S_{mon2}$) depending on the optical power of the filtered transmit signal ($S_{TX,f}$);
  wherein the controller unit (13), which receives the first ($S_{mon1}$) and second ($S_{mon2}$) electrical monitoring signals, (i) tunes the tunable optical narrow-band filter (5, 5') with respect to the spectral position of the narrow filter band that is applied to the receive signal ($S_{RX}$) such that the first electrical monitoring signal ($S_{mon1}$) reaches a maximum value, and (ii) tunes the spectral position of the wavelength spectrum of the optical transmit signal ($S_{TX}$) with respect to the spectral position of a predetermined one of the at least one narrow filter bands that is applied to the transmit signal ($S_{TX}$) such that the second electrical monitoring signal ($S_{mon2}$) reaches a maximum value.

6. An optical transceiver device according to claim 5, wherein:
the tunable optical narrow-band filter is a reflective filter (5'); and
the optical input path comprises a first optical signal switching device (3) for feeding the optical receive signal ($S_{RX}$) from the transceiver device input port (15) to a first port of the tunable optical narrow-band filter (5') and for feeding the reflected portion of the optical receive signal ($S_{RX}$) from the tunable optical narrow-band filter first port to the optical receiver unit (11).

7. An optical transceiver device according to claim 6, wherein the optical output path comprises a second optical signal switching device (7) for feeding the optical transmit signal ($S_{TX}$) from the tunable optical transmitter unit (9) to a second port of the tunable optical narrow-band filter (5') and for feeding the reflected portion of the optical transmit signal ($S_{TX}$) from the tunable optical narrow-band filter second port to the transceiver device output port (31).

8. An optical transceiver device according to claim 5, wherein:
the tunable optical narrow-band filter comprises a transmission filter (5);
the optical input path further comprises (i) a first optical signal switching device (3) for feeding the optical receive signal ($S_{RX}$) from the transceiver device input port (15) to a first port of the tunable optical narrow-band filter (5) and (ii) a second optical signal switching device (7) for feeding the transmitted portion of the optical receive signal ($S_{RX}$) from a second port of the tunable optical narrow-band filter (5) to the optical receiver unit (11).

9. An optical transceiver device according to claim 8, wherein:
the second optical signal switching device (7) feeds the optical transmit signal ($S_{TX}$) from the transmitter unit (9) to the tunable optical narrow-band filter second port; and
the first optical signal switching device (3) feeds the transmitted portion of the optical transmit signal (STX) from the tunable optical narrow-band filter second port to the optical transceiver output port (31).

10. An optical transceiver device according to claim 5, wherein:
the tunable optical narrow-band filter is a transmission filter (5), the transceiver device input and output port being a single input/output port (50) connected to a first port of the tunable optical narrow-band filter (5);
the optical input path comprises an optical signal switching device (52) (i) for feeding a portion of the optical receive signal ($S_{RX}$) which is transmitted through the tunable optical narrow-band filter (5) from a second port of the tunable optical narrow-band filter (5) to the optical receiver unit (11), and (ii) for feeding the optical transmit signal ($S_{TX}$) received from the optical transmitter unit (9) to the tunable optical narrow-band filter second port.

11. An optical transceiver device according to claim 5, wherein the transmit signal ($S_{TX}$) is created with an optical spectrum lying within the same narrow filter band of the tunable optical narrow-band filter (5, 5') that is used for tuning the tunable optical narrow-band filter (5, 5') to the optical spectrum of the optical receive signal ($S_{RX}$).

12. An optical transceiver device according to claim 11, wherein a optical signal switching device is an optical circulator device (3, 7).

13. An optical transceiver device according to claim 5, wherein the transmit signal ($S_{TX}$) is created with an optical spectrum lying within a different narrow filter band of the tunable optical narrow-band filter (5, 5') than the narrow filter band that is used for tuning the tunable optical narrow-band filter (5, 5') to the optical spectrum of the optical receive signal ($S_{RX}$).

14. An optical transceiver device according to claim 13, wherein a optical signal switching device is an optical circulator device (3, 7).

15. An optical transceiver device according to claim 13, wherein a optical signal switching device is an optical band splitting device (52) for separating and combining the optical transmit signal ($S_{TX}$) and the optical receive signal ($S_{RX}$) lying in the different narrow filter bands.

16. An optical transceiver device according to claim 5, wherein the device (25) for tapping off a portion of the optical power of the filtered receive signal ($S_{RX,f}$) as a first monitoring signal is an optical coupler, and the device (26) for tapping off a portion of the optical power of the filtered transmit signal ($S_{TX,f}$) as a second monitoring signal is an optical coupler.

* * * * *